(12) United States Patent
Nusier et al.

(10) Patent No.: US 12,448,076 B2
(45) Date of Patent: Oct. 21, 2025

(54) BRACE FOR THREE-WHEELED VEHICLE

(71) Applicant: Ford Global Technologies, LLC, Dearborn, MI (US)

(72) Inventors: Saied Nusier, Canton, MI (US); Jamel E. Belwafa, Ann Arbor, MI (US); Srinivasan Sundararajan, Ann Arbor, MI (US); Rahul Arora, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 386 days.

(21) Appl. No.: 18/301,415

(22) Filed: Apr. 17, 2023

(65) Prior Publication Data
US 2024/0343334 A1    Oct. 17, 2024

(51) Int. Cl.
| | |
|---|---|
| *B62K 5/00* | (2013.01) |
| *B62K 5/027* | (2013.01) |
| *B62K 5/06* | (2006.01) |
| *B62J 27/30* | (2020.01) |

(52) U.S. Cl.
CPC .............. *B62K 5/06* (2013.01); *B62K 5/027* (2013.01); *B62J 27/30* (2020.02)

(58) Field of Classification Search
CPC .......... B62K 5/06; B62K 5/027; B62K 21/00; B62K 21/005; B62J 27/30
See application file for complete search history.

(56) References Cited

U.S. PATENT DOCUMENTS

| | | | | |
|---|---|---|---|---|
| 1,557,634 A | * | 10/1925 | Walter .................. | B62M 11/00 280/256 |
| 2,558,880 A | * | 7/1951 | Sartain .................... | B62J 27/30 40/200 |
| 3,023,027 A | * | 2/1962 | Franciscus .............. | B62J 50/26 D12/186 |
| 3,997,185 A | * | 12/1976 | Parrilla ................... | B62J 27/00 280/239 |

(Continued)

FOREIGN PATENT DOCUMENTS

| | | |
|---|---|---|
| CN | 207374579 U | 5/2018 |
| CN | 217066285 U | 7/2022 |

(Continued)

OTHER PUBLICATIONS

"Wheel Folding Electric Mobility Scooter For Adults," Suzhou Dynavolt Intelligent Vehicle Technology Co., Ltd. Comment, 2019, 1 page.

*Primary Examiner* — Steven O Douglas
(74) *Attorney, Agent, or Firm* — Frank A. MacKenzie; Brooks Kushman P.C.

(57) ABSTRACT

A vehicle includes a vehicle frame and a steering post rotatably supported by the vehicle frame. The vehicle includes a crossbar supported by the steering post. The crossbar is bisected by the steering post and the crossbar elongated in a cross-vehicle direction from a first end to a second end. The vehicle includes a brace supported by the crossbar. The brace includes a first portion, a second portion spaced from the first portion, and a curved portion connecting the first portion to the second portion. The first portion is supported by the first end of the crossbar and the second portion is supported by the second end of the crossbar.

16 Claims, 10 Drawing Sheets

(56) References Cited

U.S. PATENT DOCUMENTS

| | | | | |
|---|---|---|---|---|
| 5,950,755 A | * | 9/1999 | Kemmerer | B62D 61/08 |
| | | | | 180/216 |
| 8,967,315 B1 | * | 3/2015 | Lescallett | B62J 27/30 |
| | | | | 180/311 |
| 2022/0348282 A1 | * | 11/2022 | Ryckman | B62J 27/00 |

FOREIGN PATENT DOCUMENTS

| | | |
|---|---|---|
| CN | 217074650 U | 7/2022 |
| JP | 03286764 A | 12/1991 |

* cited by examiner

BRACE FOR THREE-WHEELED VEHICLE

BACKGROUND

Three-wheeled vehicles are lightweight, affordable vehicles used in urban transportation. Three-wheeled vehicles can be designed to accommodate a single-occupant or multiple occupants. Three-wheeled vehicles may have features that control deformation of a body and/or frame of the vehicle and/or other external components of the vehicle in the event of certain vehicle impacts, e.g., certain frontal vehicle impacts.

DETAILED DESCRIPTION

A vehicle includes a vehicle frame and a steering post rotatably supported by the vehicle frame. The vehicle includes a crossbar supported by the steering post. The crossbar is bisected by the steering post and the crossbar elongated in a cross-vehicle direction from a first end to a second end. The vehicle includes a brace supported by the crossbar. The brace includes a first portion, a second portion spaced from the first portion, and a curved portion connecting the first portion to the second portion. The first portion is supported by the first end of the crossbar and the second portion is supported by the second end of the crossbar.

The brace may include a notch between the first portion and the curved portion. The brace may be bendable at the notch relative to the vehicle frame.

The brace may include a second notch between the second portion and the curved portion. The second notch may be spaced from the notch and the brace may be bendable at the second notch relative to the vehicle frame.

The brace may be slidably supported by the crossbar.

The crossbar may include a first bracket fixed at the first end and a second bracket fixed at the second end. The first portion of the brace may be slidably supported by the first bracket and the second portion of the brace may be slidably supported by the second bracket.

The first bracket may define a first hole and the second bracket may define a second hole. The first portion of the brace may be slidably supported by the first hole and the second portion of the brace may be slidably supported by the second hole.

The crossbar may define a first hole at the first end and the crossbar may define a second hole at the second end. The first portion of the brace may be slidably supported by the first hole and the second portion of the brace being slidably supported by the second hole.

The vehicle frame may be elongated along a vehicle-longitudinal axis. The brace may be slidable relative to the crossbar along the vehicle-longitudinal axis.

The brace may be elongated along the vehicle-longitudinal axis.

The first portion and the second portion of the brace may be elongated along the vehicle-longitudinal axis.

The vehicle may include a wheel connected to the steering post. The brace may be supported upwardly along the steering post from the wheel.

The steering post may be rotatable about an axis. The crossbar and the brace may be rotatable about the axis.

The vehicle may include a wheel connected to the steering post. The brace may be supported upwardly along the axis from the wheel.

The brace may be symmetrical about the steering post.

The brace may be elongated vehicle-forward of the steering post.

The brace may be elongated vehicle-forward of the vehicle frame.

With reference to the Figures, wherein like numerals indicate like parts throughout the several views, a vehicle 10, specifically a three-wheeled vehicle 10, includes a vehicle frame 12 and a steering post 14 rotatably supported by the vehicle frame 12. The three-wheeled vehicle 10 includes a crossbar 16 supported by the steering post 14. The crossbar 16 is bisected by the steering post 14 and the crossbar 16 elongated in a cross-vehicle direction C from a first end 18 to a second end 20. The three-wheeled vehicle 10 includes a brace 22 supported by the crossbar 16. The brace 22 includes a first portion 24, a second portion 26 spaced from the first portion 24, and a curved portion 28 connecting the first portion 24 to the second portion 26. The first portion 24 is supported by the first end 18 of the crossbar 16 and the second portion 26 is supported by the second end 20 of the crossbar 16.

The brace 22 may manage deformation into the three-wheeled vehicle 10 during certain vehicle impacts, i.e., when a force above a predetermined level during certain vehicle impacts is applied to the brace 22. The force of the brace 22 against the crossbar 16 allows a top portion of the steering post 14 to rotate away from an occupant of the three-wheeled vehicle 10. The force on the crossbar 16 rotates a bottom portion of the steering post 14 toward the occupant which rotates the top portion of the steering post 14 away from the occupant.

Two examples of the three-wheeled vehicle 10 are shown in the Figures and common numerals are used to identify common features in the examples. A first example of the three-wheeled vehicle 10 is shown in FIGS. 2A, 2B, 3A, 3B, and 4A-4E. In such an example, the three-wheeled vehicle 10 includes the brace 22 supported by brackets 82, 84 of the crossbar 16. A second example of the three-wheeled vehicle 10 is shown in FIGS. 2B and 3C. In such an example, the three-wheeled vehicle 10 includes the brace 22 supported by holes 90, 92 of the crossbar 16.

Figure 1:
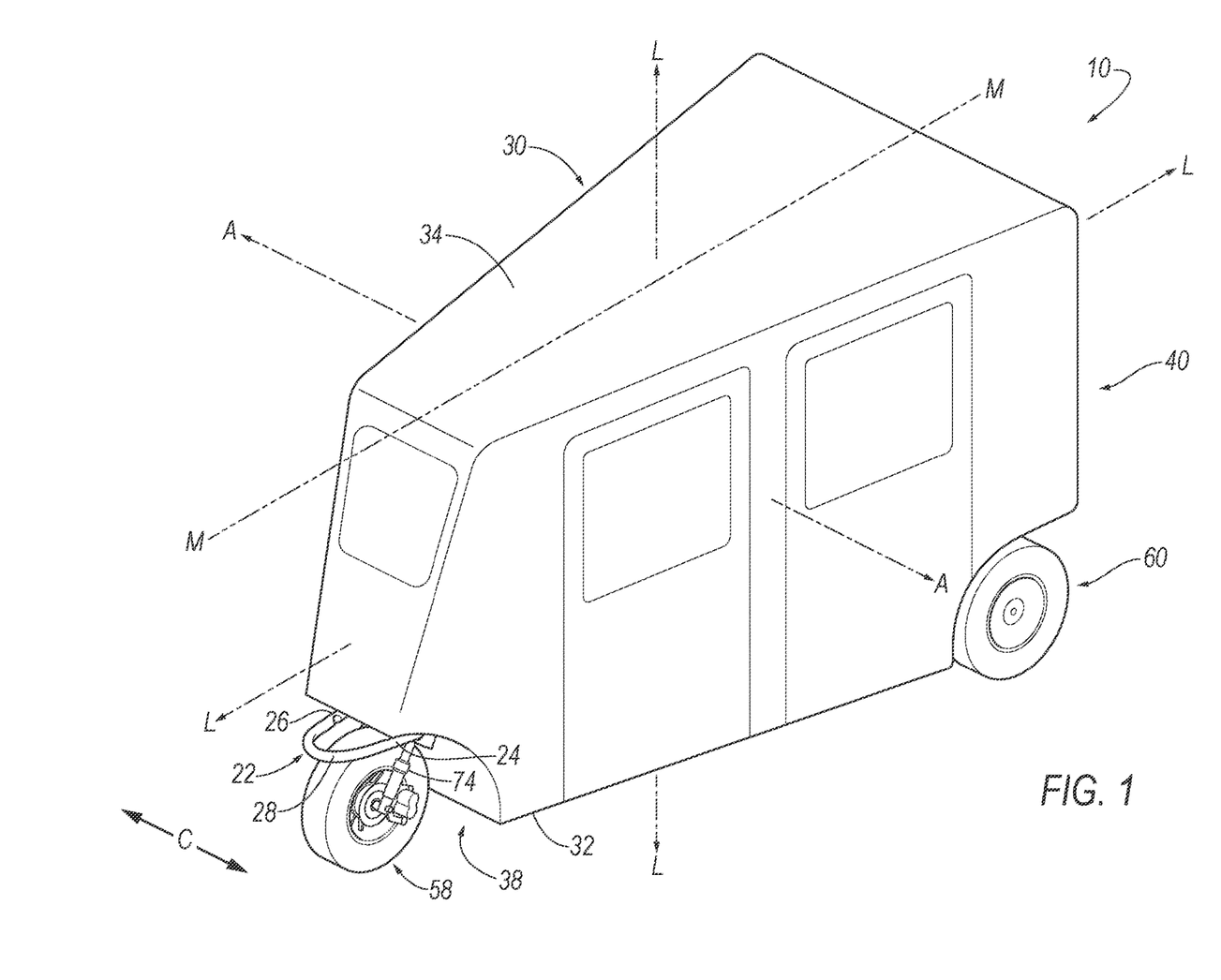
FIG. 1 is a perspective view of a three-wheeled vehicle.

With reference to FIG. 1, the three-wheeled vehicle 10 may be any suitable type of ground vehicle, e.g., a passenger or commercial automobile. For example, the three-wheeled vehicle 10 may be any suitable type of ground vehicle, e.g., a motorized tricycle, auto rickshaw, tuk, etc. As shown in the Figures, the three-wheeled vehicle 10 may be a motorcycle-based vehicle.

With reference to FIG. 1, the three-wheeled vehicle 10 defines a vehicle-longitudinal axis L extending between a front vehicle end (not numbered) and a rear vehicle end (not numbered) of the three-wheeled vehicle 10. The three-wheeled vehicle 10 defines a cross-vehicle axis A extending cross-vehicle from one side to the other side of the three-wheeled vehicle 10. The cross-vehicle direction C is parallel to the cross-vehicle axis A. The three-wheeled vehicle 10 defines a vertical axis V. The vehicle-longitudinal axis L, the cross-vehicle axis A, and the vertical axis V are perpendicular relative to each other.

The three-wheeled vehicle 10 includes the vehicle frame 12 and a vehicle body 30. The vehicle frame 12 may be of a unibody construction in which the vehicle frame 12 is unitary with the vehicle body 30 including frame rails, pillars, roof rails, etc. As another example, the vehicle body 30 and vehicle frame 12 may have a body-on-frame construction also referred to as a cab-on-frame construction in which the vehicle body 30 and vehicle frame 12 are separate components, i.e., are modular, and the vehicle body 30 is supported on and affixed to the vehicle frame 12. Alternatively, the vehicle frame 12 and vehicle body 30 may have any suitable construction. The vehicle frame 12 and vehicle body 30 may be of any suitable material, for example, steel, aluminum, and/or fiber-reinforced plastic, etc.

With reference to FIGS. 2A, 2B, 5A, and 5B, the three-wheeled vehicle 10 may house one or more occupants. Specifically, the vehicle frame 12 defines an occupant compartment 36 to house one or more occupants of the three-wheeled vehicle 10. The occupant compartment 36 may extend across the three-wheeled vehicle 10, i.e., from one side to the other side of the three-wheeled vehicle 10. The occupant compartment 36 may extend from a front end 38 to a rear end 40 with the front end 38 being in front of the rear end 40 during forward motion of the three-wheeled vehicle 10. The three-wheeled vehicle 10 may accommodate one or more occupants. For example, as shown in the Figures, the three-wheeled vehicle 10 may accommodate more than one occupant, e.g., two or three occupants. In other examples not shown in the Figures, the three-wheeled vehicle 10 may accommodate a single occupant. In other words, the occupant compartment 36 is sized and shaped to house only one occupant.

The three-wheeled vehicle 10 may define a midline M elongated along the vehicle-longitudinal axis L, i.e., vehicle fore-and-aft. The midline M of the vehicle frame 12 may be spaced equidistantly from each side of the three-wheeled vehicle 10. In other words, the midline M is in the middle of the vehicle frame 12. The vehicle frame 12 is elongated along the midline M and the vehicle-longitudinal axis L. Specifically, the vehicle frame 12 is elongated from the front end 38 to the rear end 40 along the midline M and the vehicle-longitudinal.

With continued reference to FIG. 1, the three-wheeled vehicle 10 may include body panels (not numbered). The body panels may be supported by the vehicle frame 12. Specifically, the body panels may be fixed to the vehicle frame 12. The body panels may be fixed to the vehicle frame 12 in any suitable manner, e.g., fasteners, welding, etc. The three-wheeled vehicle 10 may include any suitable number of body panels supported by the vehicle frame 12 at any suitable location of the three-wheeled vehicle 10. For example, the three-wheeled vehicle 10 may include a body panel supported by each side of the three-wheeled vehicle 10, a vehicle floor 32, a vehicle roof 34, etc. The body panels may be made of any suitable material, e.g., steel, aluminum, composite, plastic, etc.

The vehicle roof 34 and the vehicle floor 32 are spaced from each other. Specifically, the vehicle floor 32 is spaced downwardly from the vehicle roof 34. The vehicle roof 34 defines the upper boundary of the occupant compartment 36 and may extend from the front end 38 of the occupant compartment 36 to the rear end 40 of the occupant compartment 36.

The vehicle floor 32 defines the lower boundary of the occupant compartment 36 and may extend from the front end 38 of the occupant compartment 36 to the rear end 40 of the occupant compartment 36. The vehicle floor 32 may include upholstery, for example, carpet, and may have a class-A surface facing the occupant compartment 36, i.e., a surface specifically manufactured to have a high quality, finished, aesthetic appearance free of blemishes.

The vehicle frame 12 may extend from the front end 38 to the rear end 40. The rear end 40 may be wider than the front end 38. Because the vehicle frame 12 is wider at the rear end 40 than at the front end 38, more occupants may be able to be housed at the rear end 40 of the vehicle frame 12 and occupant compartment 36.

The vehicle frame 12 may include any suitable number of members (not all shown) to define a shape of the three-wheeled vehicle 10. For example, as shown in the Figures, the vehicle frame 12 may include a first post 42 and a second post 44 spaced cross-vehicle from each other at the front end 38. The vehicle frame 12 may include a cross-member 46 extending from the first post 42 to the second post 44. As another example as shown in the Figures, the vehicle frame 12 may include a floor frame member 48 extending upwardly from the vehicle floor 32 to the steering post 14. As described further below, the steering post 14 may be rotatably supported by the vehicle frame 12 at the floor frame member 48.

Figure 5A:
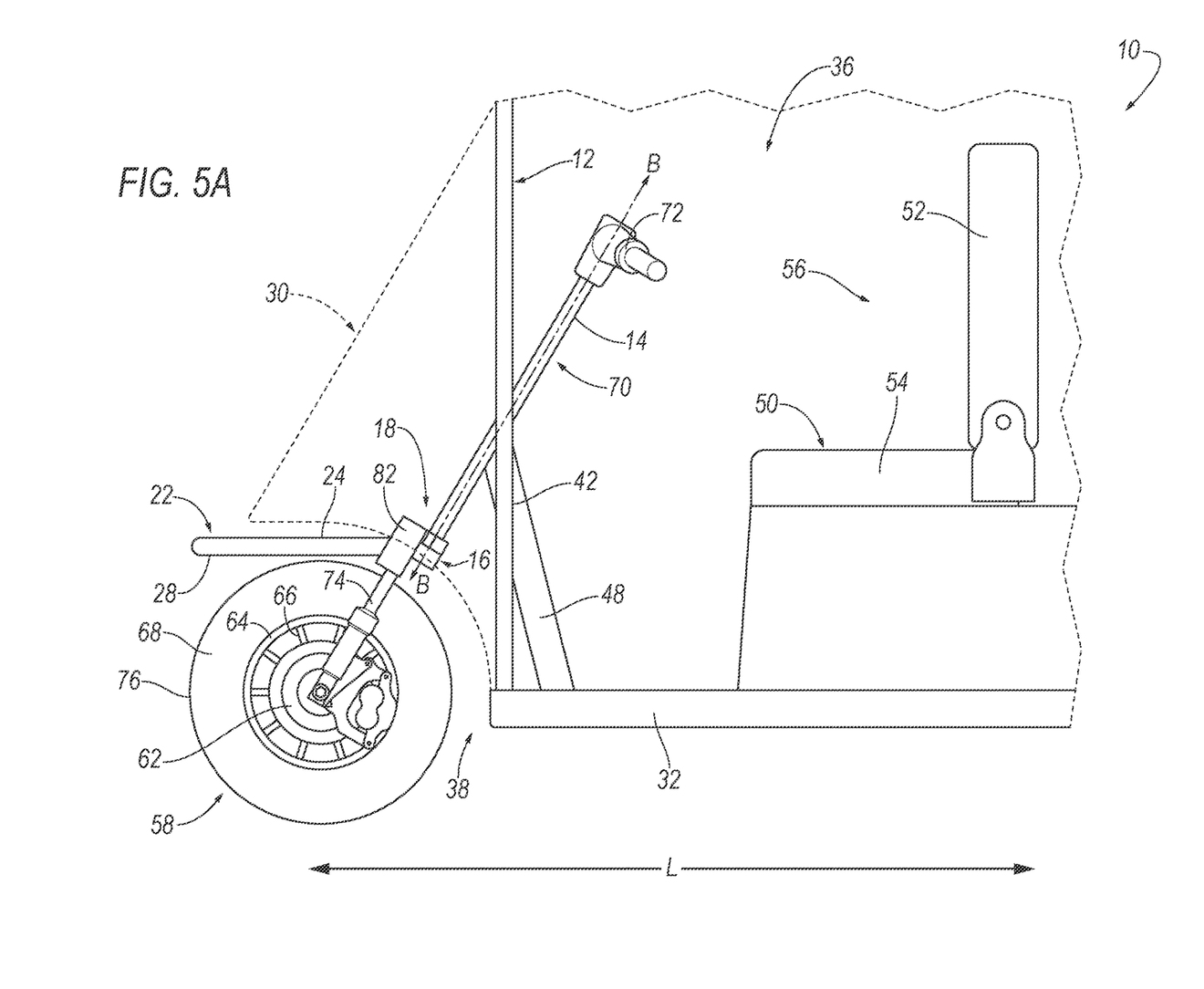
FIG. 5A is a side view of the three-wheeled vehicle prior to certain vehicle impacts.
Figure 5B:
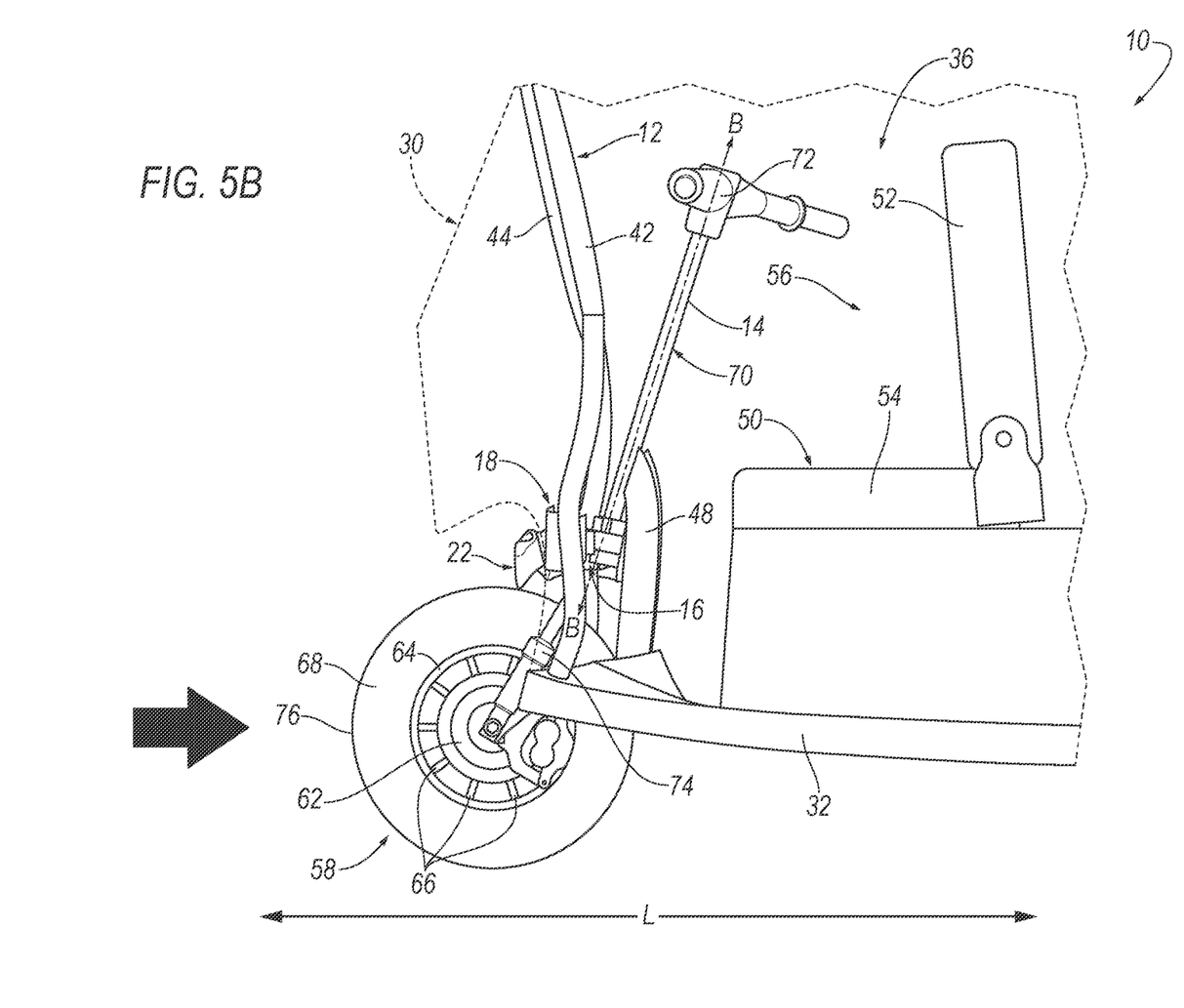
FIG. 5B is a side view of a representation of the three-wheeled vehicle after certain vehicle impacts.

With reference to FIGS. 5A and 5B, the three-wheeled vehicle 10 may include one or more seats 50 in the occupant compartment 36. For example, as shown in the Figures, the three-wheeled vehicle 10 may include a front seat 50, hereinafter referred to as the "seat," and a rear seat (not shown) in the occupant compartment 36. The front seat 50 may be adjacent the front end 38 and the rear seat may be adjacent the rear end 40. In other words, the front seat 50 may be vehicle-forward of the rear seat. The three-wheeled vehicle 10 may be driven by an occupant of front seat 50 and other occupants may be seated in the rear seat as passengers.

The seat 50 may include a seatback 52 and a seat bottom 54. The seatback 52 may be supported by the seat bottom 54 and may be stationary or movable relative to the seat bottom 54. The seatback 52 and the seat bottom 54 may be adjustable in multiple degrees of freedom. The seat 50 may be moveable relative to the vehicle floor 32 to various positions, e.g., movable fore-and-aft and/or cross-vehicle. The seat 50 may be of any suitable type, e.g., a bucket seat or a bench seat elongated across the occupant compartment 36.

The seat 50 defines an occupant seating area 56. The occupant seating area 56 is the area occupied by an occupant when properly seated on the seat 50. The occupant seating area 56 is in a seat-forward direction (not labeled) of the seatback 52 and above the seat bottom 54.

The three-wheeled vehicle 10 may include one or more vehicle doors (not numbered) openable relative to the vehicle frame 12 for occupant ingress and egress. In other words, the vehicle doors provides access to the seat 50 in the occupant compartment 36. The three-wheeled vehicle 10 may include one or more vehicle doors per side of the three-wheeled vehicle 10. In the example shown in the Figures, the three-wheeled vehicle 10 may include a vehicle door adjacent the front seat 50 and a vehicle door adjacent the rear seat. The three-wheeled vehicle 10 may include an equal number of vehicle doors on the opposite side of the three-wheeled vehicle 10. The vehicle door may be hingedly connected to the vehicle frame 12.

As shown in the Figures, the three-wheeled vehicle 10 includes a single front wheel 58 and two rear wheels 60. The front wheel 58 is disposed vehicle-forward of the front end 38 of the occupant compartment 36 and the rear wheels 60 are disposed adjacent the rear end 40. In other words, the front wheel is disposed at the front vehicle end and the rear wheels are disposed at the rear vehicle end. The front wheel 58 and rear wheels 60 are supported by the vehicle frame 12. Specifically, the front wheel 58 is supported by the vehicle frame 12 vehicle-forward of the front end 38 and the rear wheels 60 are supported by the vehicle frame 12 adjacent the rear end 40. The front wheel 58 is disposed at the midline M. In other words, the front wheel 58 is spaced equidistantly from each side of the three-wheeled vehicle 10 in the cross-vehicle direction C. The rear wheels 60 may be disposed on each side of the three-wheeled vehicle 10 at the rear end 40 of the three-wheeled vehicle 10. In other words, the rear wheels 60 are spaced cross-vehicle from each other. The three-wheeled vehicle 10 may include a rear wheel 60 on each side of the midline M of the three-wheeled vehicle 10.

The front wheel 58 and the two rear wheels 60 are rotatable relative to the vehicle frame 12. Each front wheel 58 and rear wheel 60 may include a hub 62 about which the wheels 58, 60 rotate, a rim 64 concentric with the hub 62, a plurality of spokes 66 spaced circumferentially about the hub 62 and extending from the hub 62 to the rim 64, and a tire 68 fitted about the rim 64. The front wheel 58 and the rear wheels 60 include an axel (not shown) supported by the vehicle frame 12 that extends through the hub 62 and the hub 62, rim 64 and tire 68 are rotatable relative to the axel. In other words, the hub 62, the rim 64 and the tire 68 rotate about the axel to allow the wheels 58, 60 to rotate relative to the vehicle frame 12. The axel is supported by the vehicle frame 12 in any suitable way. As described further below, the axel is coupled to a steering system 70 to allow the front wheel 58 to be steered by an occupant.

The three-wheeled vehicle 10 may include any suitable number of subsystems coupled to one or more of the front wheel 58 and rear wheels 60. For example, the three-wheeled vehicle 10 may include a suspension system that absorbs and dampens shocks and vibrations from the wheels 58, 60, a braking system that decelerates the three-wheeled vehicle 10, a powertrain to drive the front wheel 58 or the rear wheels 60, the steering system 70 as described further below, and/or any other suitable subsystems.

Figure 2A:
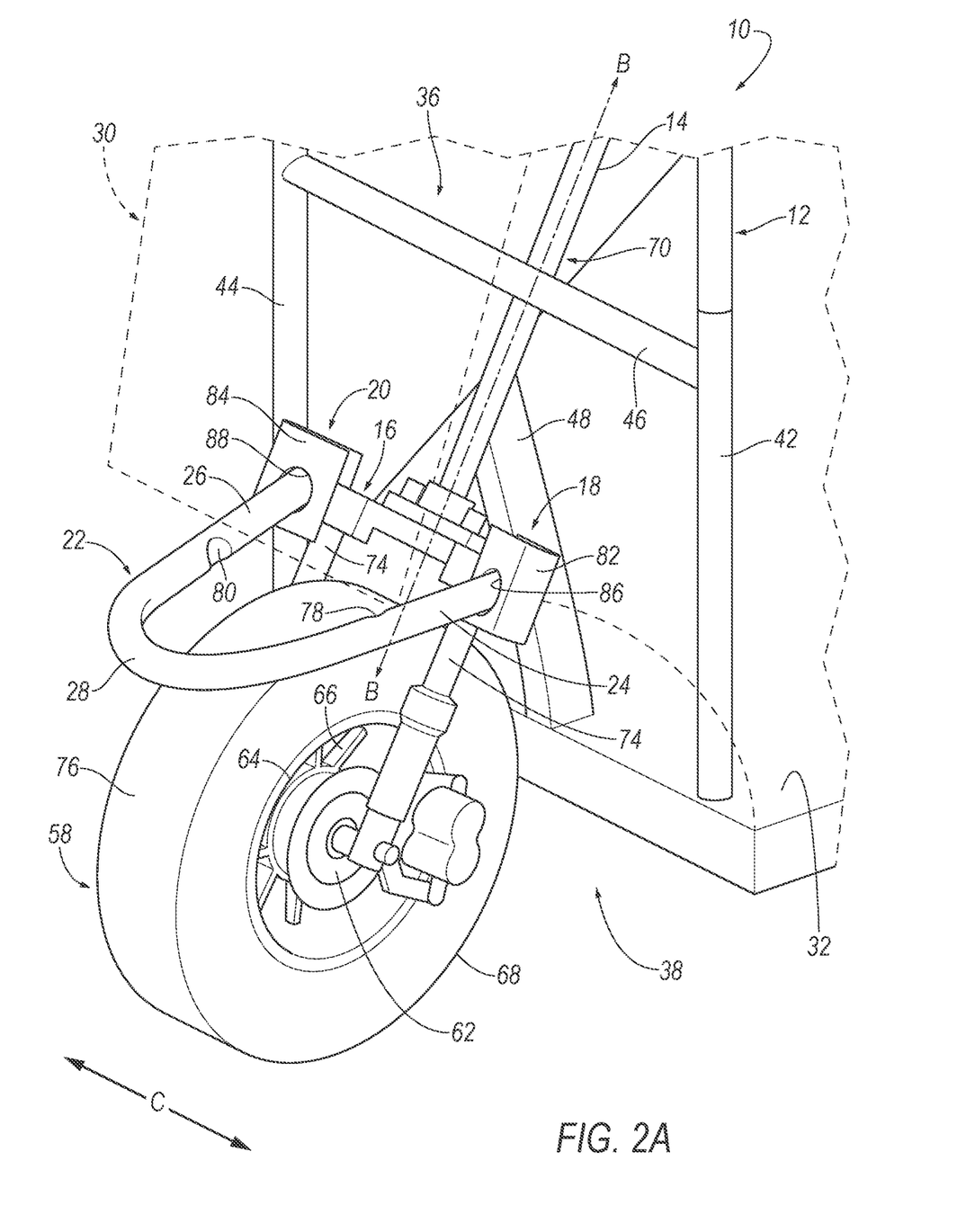
FIG. 2A is a perspective view of a front wheel and a first example of a brace for the three-wheeled vehicle.
Figure 2B:
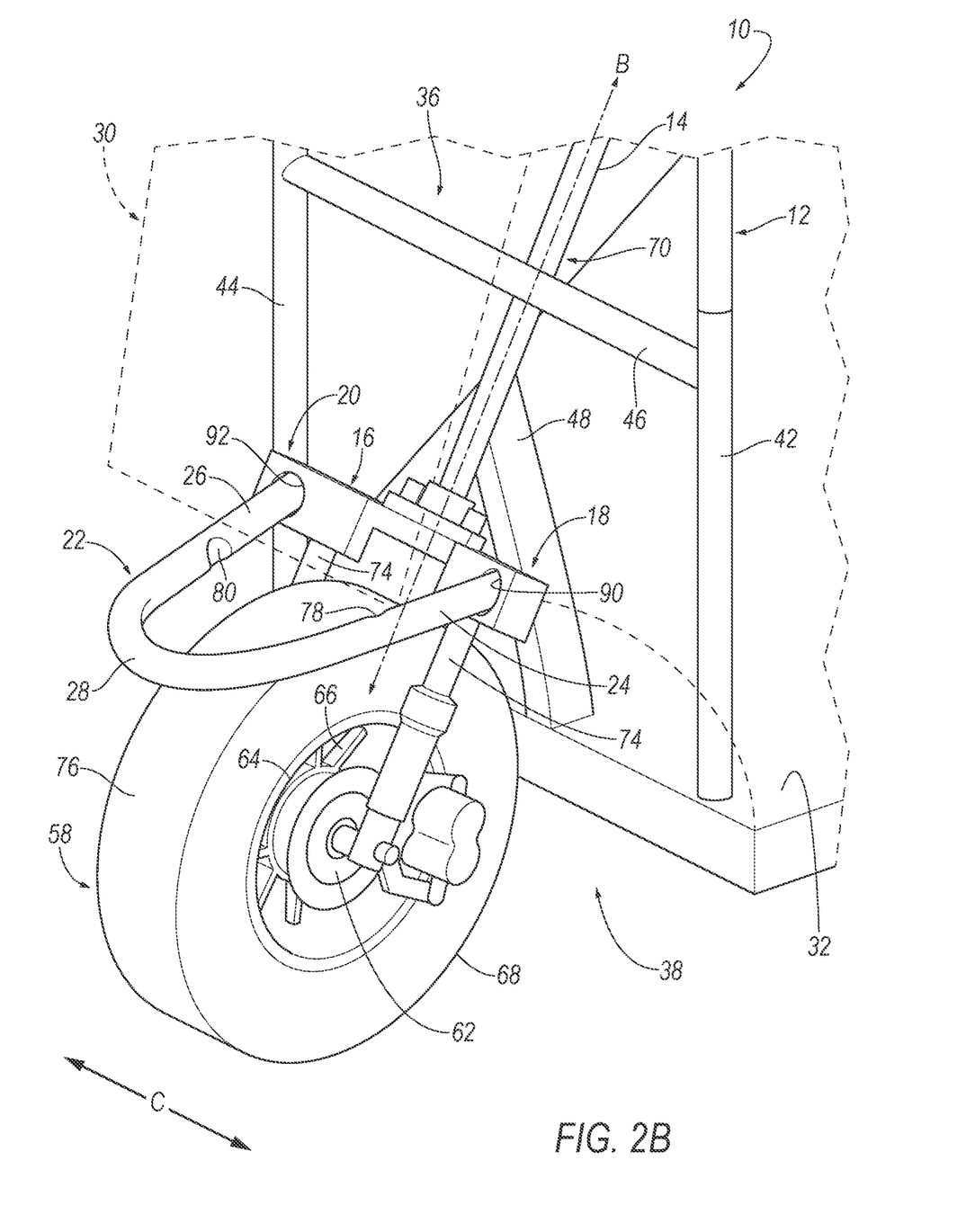
FIG. 2B is a perspective view of the front wheel and a second example of a brace for a three-wheeled vehicle.
Figures 3A, 3B:
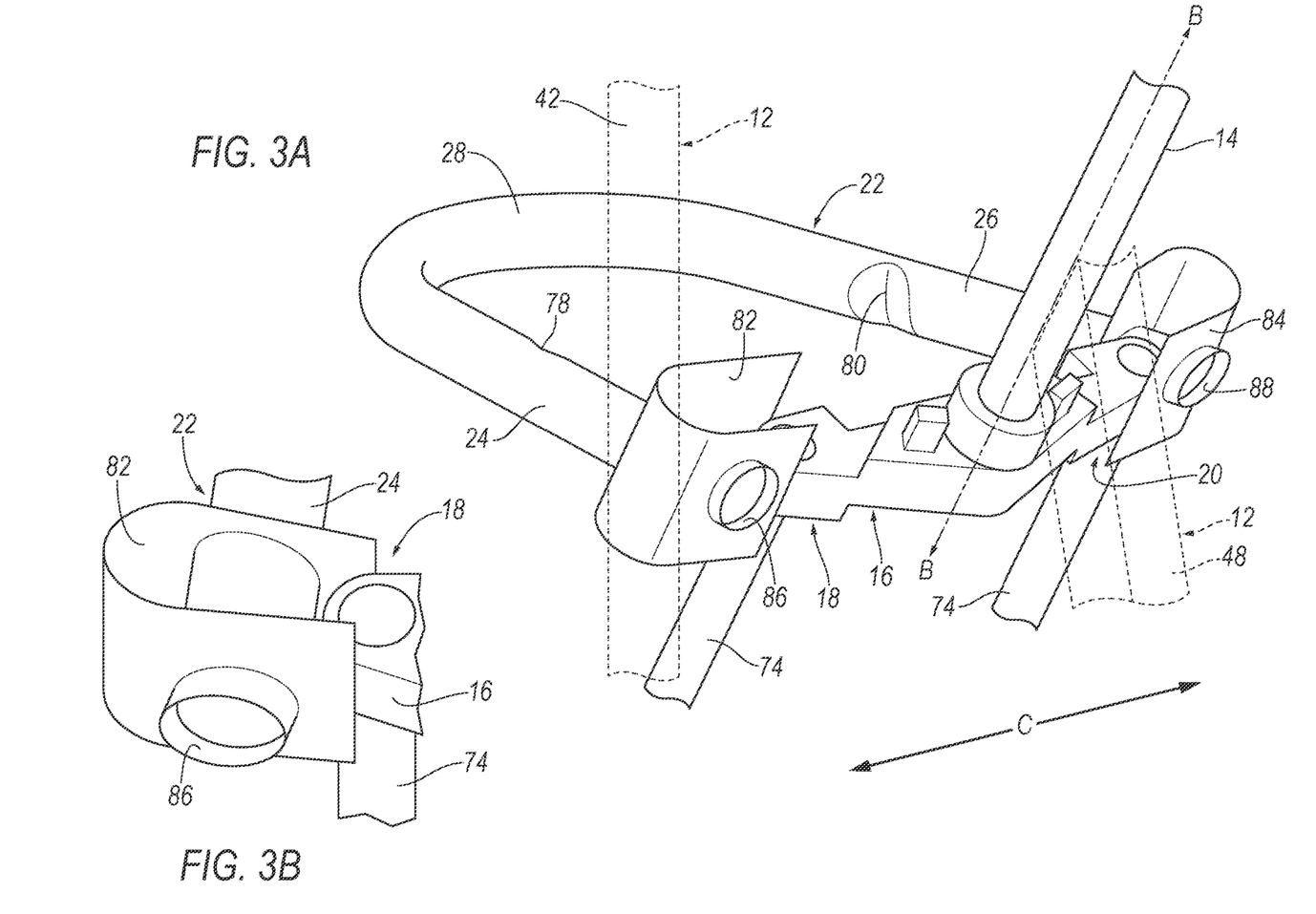
FIG. 3A is a perspective view of the first example of the brace for the three-wheeled vehicle.
FIG. 3B is a perspective view of a bracket of the first example of the brace.
Figure 3C:
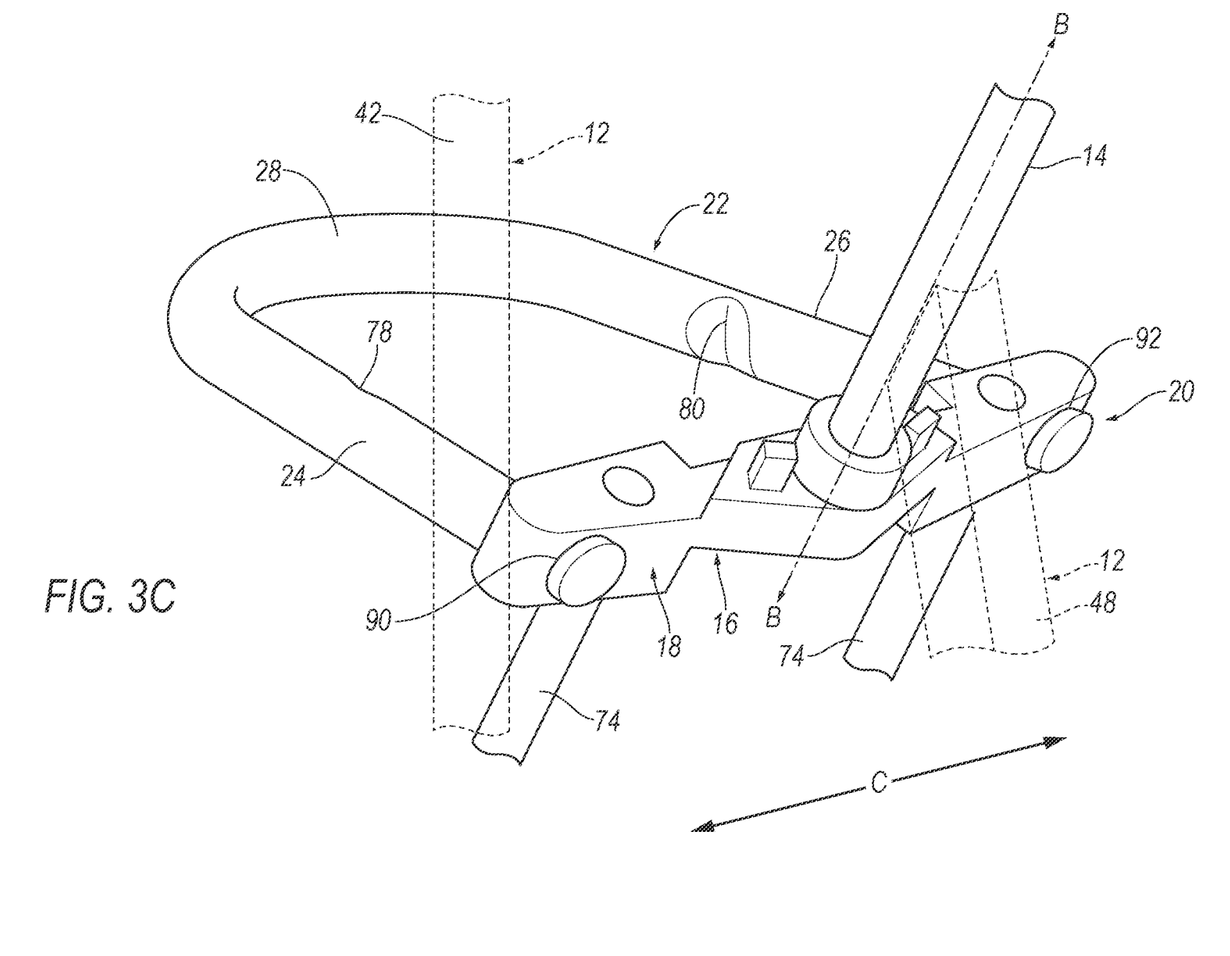
FIG. 3C is a perspective view of the second example of the brace for the three-wheeled vehicle.

With reference to FIGS. 2A and 2B, the three-wheeled vehicle 10 includes the steering system 70 positioned at the front end 38. The steering system 70 is coupled to the front wheel 58 to allow an occupant to steer the three-wheeled vehicle 10 as the three-wheeled vehicle 10 is in motion. The steering system 70 is rotatably supported by the vehicle frame 12 to steer the three-wheeled vehicle 10. The steering system 70 is elongated upwardly from the hub 62 and the axel of the front wheel 58 to a steering device 72 inside the occupant compartment 36, e.g., handle-bars, a steering wheel, etc. In other words, the steering system 70 is elongated upwardly from the hub 62 and the axel and into the occupant compartment 36 to allow the occupant to have access to the steering device 72 inside the occupant compartment 36. The steering system 70 is aligned with the midline M of the three-wheeled vehicle 10. In other words, the steering system 70 may be positioned between the first post 42 and the second post 44 of the vehicle frame 12.

The steering system 70 includes the steering post 14, the crossbar 16, and a pair of beams 74. The steering device 72 is supported by the steering post 14. Specifically, the steering device 72 extends downwardly from the steering device 72 to the crossbar 16. The steering post 14 may be elongated along an axis B. The steering post 14 may be aligned with the midline M of the three-wheeled vehicle 10. In other words, the steering post 14 may be between the first post 42 and the second post 44.

The steering post 14 is rotatably supported by the vehicle frame 12. The floor frame member 48 extends upwardly from the vehicle floor 32 to the steering post 14. The steering post 14 is rotatably supported by the floor frame member 48. In other words, the steering post 14 is rotatable relative to the vehicle frame 12, i.e., the floor frame member 48. Specifically, the steering post 14 is rotatable about the axis B elongated along the steering post 14. When an occupant turns the three-wheeled vehicle 10, the occupant turns the steering device 72 in the desired direction, e.g., clockwise or counterclockwise, and the steering post 14 rotates about the axis B in the desired direction. Turning the steering device 72 turns the steering post 14 to allow the three-wheeled vehicle 10 to turn right or left during forward and rearward motion of the three-wheeled vehicle 10.

With reference to FIGS. 2A-4E, the steering post 14 is connected to the front wheel 58 such that when an occupant turns the steering device 72, the steering post 14 rotates to turn the front wheel 58 in the desired direction of the occupant. As in the example shown in the Figures, the steering post 14 is indirectly connected to the front wheel 58. In other words, other components, for example the crossbar 16 and beams 74 as described below, may be between the steering post 14 and the front wheel 58 such that when the steering post 14 rotates about the axis B, the front wheel 58 rotates in the desired direction of the occupant.

The crossbar 16 is supported by the steering post 14. In other words, the crossbar 16 is connected to the steering post 14. Specifically, the crossbar 16 is fixed to the steering post 14. As an occupant is turning the three-wheeled vehicle 10, the occupant may rotate the steering device 72 which rotates the steering post 14 about the axis B. As the steering post 14 rotates about the axis B, the crossbar 16 rotates about the axis B. In other words, both the steering post 14 and the crossbar 16 rotate about the axis B as a unit.

The crossbar 16 is elongated in the cross-vehicle direction C. The crossbar 16 is positioned along the cross-vehicle axis A between cross-vehicle positions of the first post 42 and the second post 44 along the cross-vehicle axis A. The crossbar 16 may be elongated parallel to the cross-member 46 of the vehicle frame 12. Specifically, the crossbar 16 is elongated in the cross-vehicle direction C from the first end 18 to the second end 20. When the steering post 14 is positioned such that the three-wheeled vehicle 10 moves in the forward direction, the first end 18 may be adjacent the first post 42 of the vehicle frame 12 and the second end 20 may be adjacent the second post 44 of the vehicle frame 12.

The crossbar 16 is fixed to the steering post 14 such that the crossbar 16 is bisected by the steering post 14. In other words, a first distance from the first end 18 to the steering post 14 and a second distance from the second end 20 to the steering post 14 are equal. As the steering post 14 rotates about the axis B, the first end 18 and the second end 20 rotate about the axis B at equal distances from the steering post 14.

The steering system 70 includes a pair of beams 74. Each of the beams 74 of the steering system 70 extend downwardly from the crossbar 16. In other words, the beams 74 are elongated from the crossbar 16 toward the front wheel 58. Specifically, one of the beams 74 is elongated downwardly from the first end 18 of the crossbar 16 and the other of the beams 74 is elongated downwardly from the second end 20 of the crossbar 16 with the steering post 14 being between the beams 74.

The beams 74 are coupled to the front wheel 58. In other words, the beams 74 extend from the crossbar 16 to the front wheel 58. Specifically, the beams 74 extend from the crossbar 16 to the hub 62 and axel of the front wheel 58. One of the beams 74 is on one side of the front wheel 58 and the other beam 74 is on the other side of the front wheel 58. In other words, the front wheel 58 is between the beams 74. Each of the beams 74 is coupled to the axel of the front wheel 58. In other words, the beams 74 are on both sides of the front wheel 58 and connected to the axel on each side of the front wheel 58. The beams 74 may be included in or connected to the braking system and/or the suspension system of the front wheel 58.

With continued reference to FIGS. 2A-4E, the three-wheeled vehicle 10 includes the brace 22 supported by the steering system 70. The brace 22 is slidably supported by the steering system 70. The brace 22 is deformable and slidable relative to the vehicle frame 12 in the event of certain impacts to the three-wheeled vehicle 10. When force above a predetermined level from certain vehicle impacts is applied to the brace 22 along the vehicle-longitudinal axis L, the brace 22 may slide along the vehicle-longitudinal axis L and deform along the vehicle-longitudinal axis L. During certain vehicle impacts, after the brace 22 deforms, the vehicle frame 12 may begin to deform. Specifically, brace 22 is designed to deform when subjected to force above the predetermined level. The predetermined level may be empirically determined based on forces associated with certain vehicle impacts, e.g., based on direction and speed of certain vehicle impacts. The brace 22 deforms when subjected to force above the predetermined level.

The brace 22 is supported by the crossbar 16. In other words, the weight of the brace 22 is borne by the crossbar 16. Specifically, the brace 22 is slidably supported by the crossbar 16. In other words, the brace 22 is slidable relative to the crossbar 16 along the vehicle-longitudinal axis L. The brace 22 is slidable in only one direction, e.g., vehicle-rearward, in the event of certain vehicle impacts. During normal operation, e.g., driving, of the three-wheeled vehicle 10, the brace 22 remains stationary relative to the crossbar 16. A press fit between the brace 22 and the crossbar 16 limits movement of the brace 22 relative to the crossbar 16. In other words, the brace 22 remains stationary relative to the crossbar 16 due to the press fit between the brace 22 and the crossbar 16. The press fit may also be referred to as an interference fit or a friction fit. In the event of certain vehicle impacts to the three-wheeled vehicle 10, the brace 22 may slide vehicle-rearward relative to the crossbar 16. In other words, the brace 22 is only slidable when a force above a predetermined level is applied to the brace 22 during certain vehicle impacts and the force overcomes the press fit between the brace 22 and the crossbar 16.

The brace 22 is supported by the crossbar 16 above the front wheel 58. Specifically, the brace 22 is spaced upwardly from the front wheel 58. The brace 22 is supported upwardly along the steering post 14 from the front wheel 58. In other words, the brace 22 is supported upwardly along the axis B from the front wheel 58. Because the brace 22 is supported by the crossbar 16 and is stationary relative to the crossbar 16 during normal operation of the three-wheeled vehicle 10, the brace 22 rotates about the axis B when the steering post 14 and the crossbar 16 rotate about the axis B. In other words, the steering post 14, the crossbar 16, and the brace 22 rotate about the axis B as a unit.

The brace 22 is elongated along the vehicle-longitudinal axis L from the crossbar 16. Specifically, the brace 22 is elongated vehicle-forward from the crossbar 16 along the vehicle-longitudinal axis L. In other words, the brace 22 is elongated vehicle-forward of the steering post 14 and the vehicle frame 12. The brace 22 is elongated vehicle-forward of the steering post 14 and the tire 68 of the front wheel 58. The brace 22 is elongated vehicle-forward of the steering post 14 and the vehicle frame 12 to engage an impacted object during certain vehicle impacts prior to impact of the impacted object with the vehicle frame 12.

As set forth above, the brace 22 includes the first portion 24, the second portion 26 spaced from the first portion 24, and the curved portion 28 extending from the first portion 24 to the second portion 26. The brace 22 may be unitary, i.e., a single, uniform piece of material with no seams, joints, fasteners, or adhesives holding the first portion 24, the second portion 26, and the curved portion 28 together. In such an example, the first portion 24, the second portion 26, and the curved portion 28 are formed together simultaneously as a single continuous unit, e.g., by machining from a unitary blank, molding, forging, casting, extruding, etc. Non-unitary components, in contrast, are formed separately and subsequently assembled, e.g., by threaded engagement, welding, etc.

The first portion 24 and the second portion 26 are spaced cross-vehicle from each other. The first portion 24 and the second portion 26 are supported by the crossbar 16. Specifically, the first portion 24 is supported by the first end 18 of the crossbar 16 and the second end 20 is supported by the crossbar 16. The first portion 24 and the second portion 26 of the brace 22 are elongated along the vehicle-longitudinal axis L. The first portion 24 and the second portion 26 are elongated along the vehicle-longitudinal axis L vehicle-forward of the crossbar 16. The first portion 24 and the second portion 26 are each be elongated from the first end 18 and the second end 20 along the vehicle-longitudinal axis L.

The brace 22 includes the curved portion 28 connecting the first portion 24 to the second portion 26. In other words, the curved portion 28 connects the first portion 24 to the second portion 26 to define the entirety of the brace 22. Each of the first portion 24 and the second portion 26 are elongated from the crossbar 16 to the curved portion 28. The first portion 24 extends from the first end 18 of the crossbar 16 to the curved portion 28 and the second portion 26 extends from the second end 20 of the crossbar 16 to the curved portion 28.

The curved portion 28 is arced from the first portion 24 to the second portion 26. In other words, the curved portion 28 curves from the first portion 24 to the second portion 26 to connect the first portion 24 to the second portion 26. The curved portion 28 extends along the vehicle-longitudinal axis L in the same plane as the first portion 24 and the second portion 26. In other words, the curved portion 28 is elongated from the first portion 24 and the second portion 26 along the vehicle-longitudinal axis L in the same plane as the first portion 24 and the second portion 26. The curved portion 28 is farther vehicle-forward than the first portion 24 and the second portion 26. In other words, the curved portion 28 is spaced vehicle-forward from the crossbar 16 by the first portion 24 and the second portion 26.

The first portion 24 and the second portion 26 may be on each side of the front wheel 58. The first portion 24 and second portion 26 are spaced upwardly from the front wheel 58 with each of the first portion 24 and the second portion 26 being on opposite sides of the front wheel 58. The curved portion 28 is curved around a vehicle-forward end 76 of the front wheel 58. In some examples, such as shown in the Figures, the curved portion 28 may extend farther vehicle-forward than the vehicle-forward end 76 of the front wheel 58.

Figure 4A:
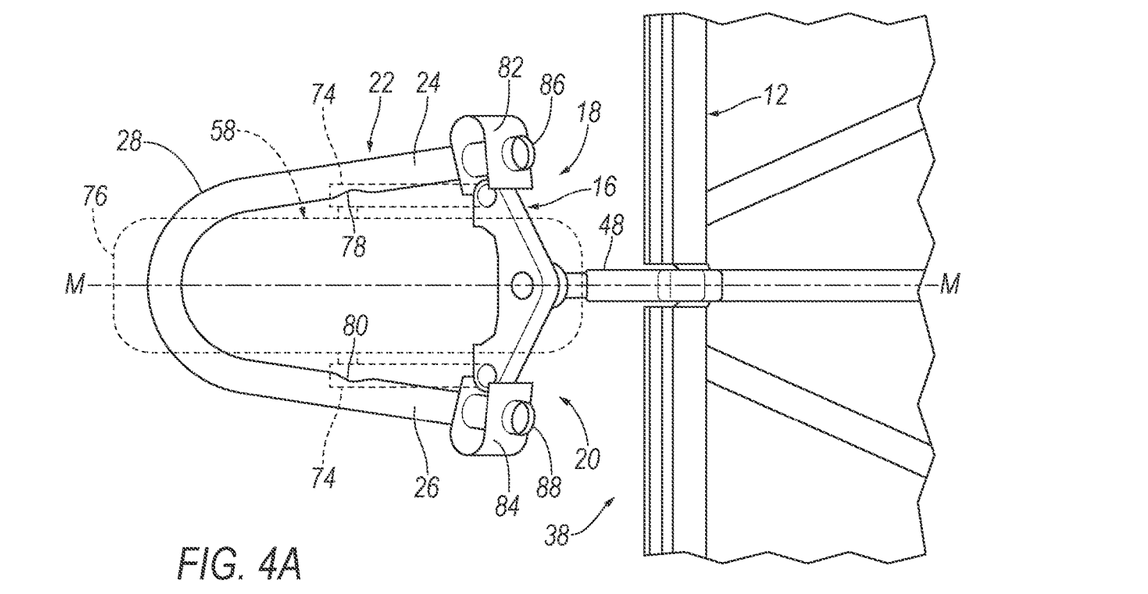
FIGS. 4A-4E is a representative progression of deformation of the brace in certain vehicle impacts.
Figure 4B:
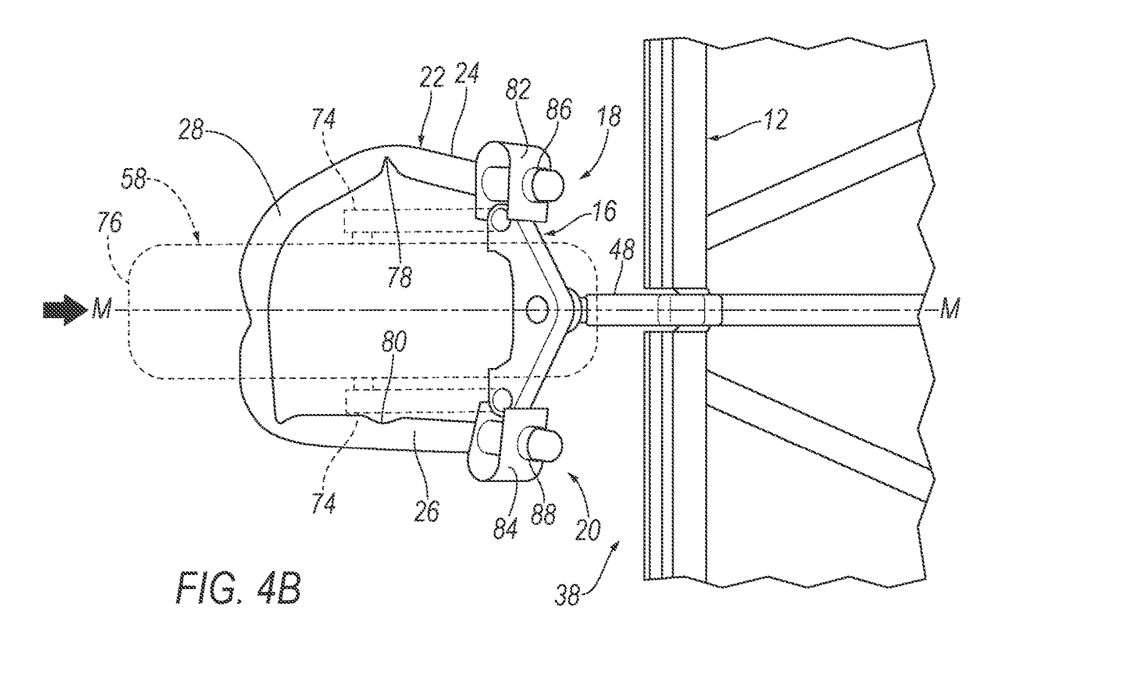
Figure 4C:
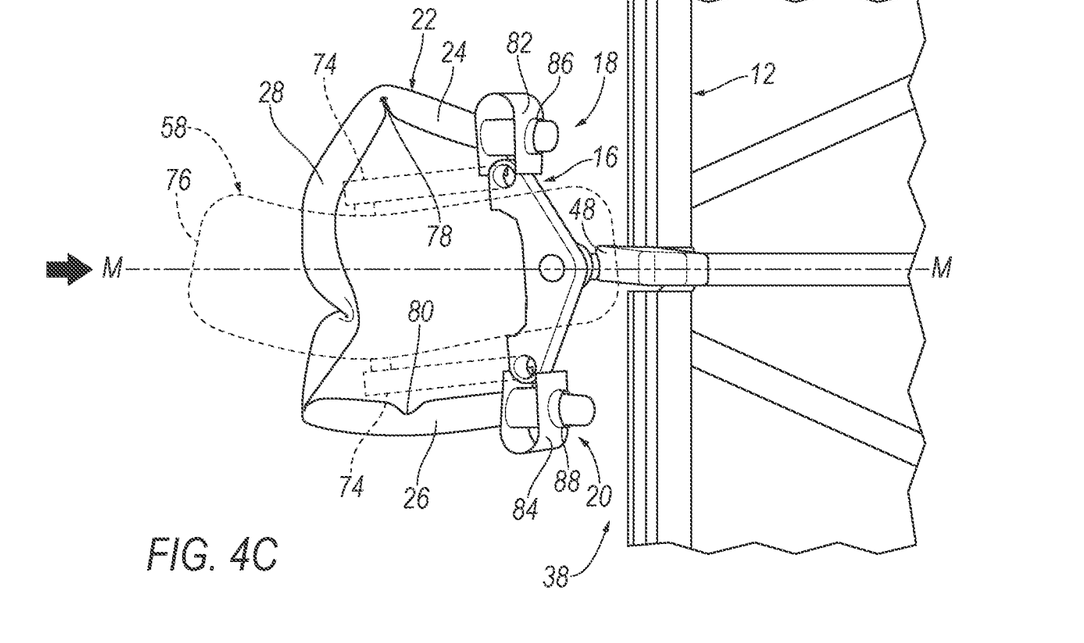
Figure 4D:
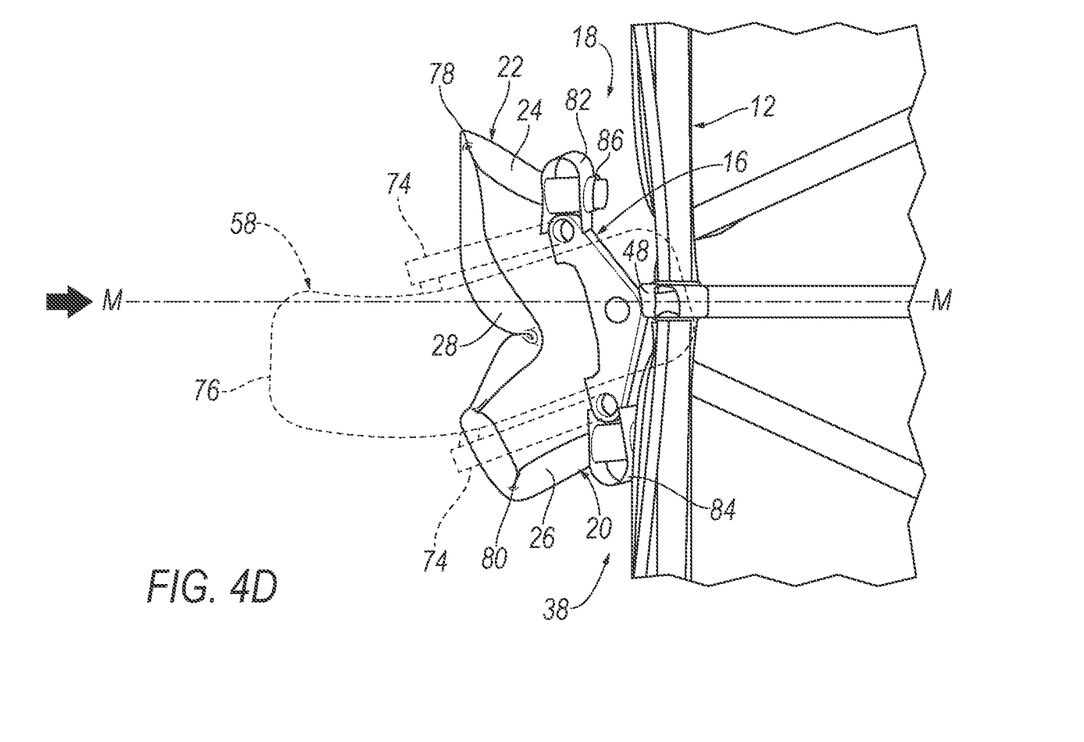
Figure 4E:
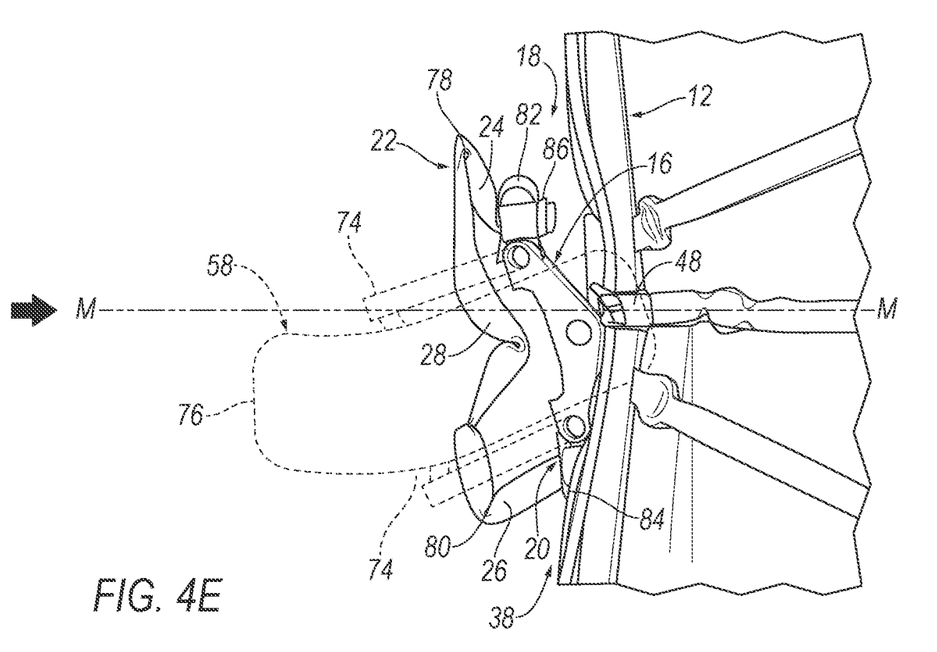

With reference to FIG. 4A, the brace 22 is symmetrical about the midline M in the cross-vehicle direction C. Specifically, the brace 22 is symmetrical about the steering post 14 in the cross-vehicle direction C. In other words, the brace 22 is shaped the same on both sides of the midline M. The first portion 24 is on one side of the midline M and the second portion 26 is on the opposite side of the midline M. The curved portion 28 is bisected by the midline M, i.e., the curved portion 28 is split in half by the midline M.

As discussed above, the brace 22 is deformable relative to the vehicle frame 12 in the event of certain vehicle impacts. Specifically, the brace 22 is deformable toward the vehicle frame 12. The brace 22 is deformable along the vehicle-longitudinal axis L. To aid in the deformability of the brace 22, the brace 22 may include one or more notches 78, 80. The brace 22 is bendable at the notches 78, 80 relative to the vehicle frame 12. As seen in the representative progression of the deformation of the brace 22 shown in FIGS. 4A-4E, a force may be applied to the brace 22 during certain vehicle impacts and the brace 22 begins to bend at the notches 78, 80. The notches 78, 80 may allow the brace 22 to bend or begin to bend at designated locations along the brace 22. The deformation, e.g., bending and crushing, of the brace 22 controls deformation of the three-wheeled vehicle during certain vehicle impacts, e.g., certain frontal vehicle impacts. The notches 78, 80 allow the brace 22 to deform along the vehicle-longitudinal axis L, e.g., in a flat plane. In other words, the notches 78, 80 allow the brace 22 remain flat while the brace 22 is deforming toward the vehicle frame 12. After the brace 22 is deformed, the vehicle frame 12 may begin to deform. The deformation of the brace 22 controls deformation of the body of the three-wheeled vehicle 10 and/or other components into the three-wheeled vehicle 10. The notches 78, 80 may be of any suitable type to trigger deformation. As an example, the notches 78, 80 may be creases in a wall of the brace 22, e.g., formed by compressing the wall of the brace 22 to locally crease the wall. As another example, the notches 78, 80 may be voids in the wall of the brace 22, e.g., formed by cutting the wall of the brace to a hollow interior of the brace 22.

In the examples shown in the Figures, the brace 22 includes a first notch 78 between the first portion 24 and the curved portion 28 and the braces 22 includes a second notch 80 between the second portion 26 and the curved portion 28. The second notch 80 is spaced from the first notch 78 along the brace 22. In other words, the curved portion 28 is between the first notch 78 and the second notch 80. The brace 22 is bendable at both the first notch 78 and the second notch 80.

The brace 22 may include any suitable number of notches 78, 80. The number of notches 78, 80 may be designed based on the designed deformation of the brace 22 during certain vehicle impacts. In examples having more than the first notch 78 and the second notch 80, the notches 78, 80 may be located at various locations along the brace 22. For example, the first portion 24, the second portion 26, and the curved portion 28 may each include notches 78, 80 beside the first notch 78 and the second notch 80.

As seen in FIGS. 5A and 5B, the brace 22 deforming along the vehicle-longitudinal rotates the steering post 14 away from an occupant of the seat 50 of the three-wheeled vehicle 10. In other words, after the brace 22 slides relative to the crossbar 16, the force of the brace 22 on the crossbar 16 rotates the bottom portion of the steering post 14 toward the seat 50 and rotates the top portion of the steering post 14, e.g., the steering device 72, away from the seat 50.

The brace 22, specifically the first portion 24, the second portion 26, and the curved portion 28, may have a round cross-section. The first portion 24, the second portion 26, and the curved portion 28 each have the same cross-section. As an example, the first portion 24, the second portion 26, and the curved portion 28 may have an annular cross-section, i.e., the first portion 24, the second portion 26, and the curved portion 28 have a hollow-circular cross-section. The brace 22 may be of any suitable cross-sectional shape. For example, as shown in the Figures, the brace 22 may have a circular cross-sectional shape continuously around the brace 22 except for locations having one of the notches 78, 80. In other examples, the brace 22 may have any other suitable cross-sectional shape. The cross-sectional shape of the brace 22 may be different at the notches 78, 80. For example, to allow for bending at notches 78, 80, the cross-sectional shape of the brace 22 may have an inconsistency with the remainder of the brace 22 at the notches 78, 80. The brace 22 may be hollow to support the deformation of the brace 22 during certain vehicle impacts. The brace 22 may be of any suitable material, e.g., steel, aluminum, composite material, etc.

The brace 22 is connected to the crossbar 16 in such a way that the brace 22 may slide relative to the crossbar 16 in the event of certain vehicle impacts. Two examples of connections between the brace 22 and the crossbar 16 are described further below. In the example shown in FIGS. 2A, 2B, 3A, 3B, and 4A-4E, the crossbar 16 includes a pair of brackets 82, 84 each supported at the first end 18 and the second end 20. In such an example, the brace 22 is connected to the brackets 82, 84 of the crossbar 16. In second example, shown in FIGS. 2A, 2B, 3A, 3B, and 4A-4E, the crossbar 16 defines a pair of holes 90, 92, one of which is at the first end 18 and the other of which is at the second end 20 of the crossbar 16. In such an example, the brace 22 is receivable by the holes 90, 92.

In a first example shown in FIGS. 2A, 2B, 3A, 3B, and 4A-4E, the crossbar 16 includes a pair of brackets 82, 84 supported at the first end 18 and the second end 20 of the crossbar 16. Specifically, the crossbar 16 includes a first bracket 82 fixed to the first end 18 of the crossbar 16 and the crossbar 16 includes a second bracket 84 fixed to the second end 20 of the crossbar 16. In other words, the brackets 82, 84 are spaced cross-vehicle from each other at the first end 18 and the second end 20 of the crossbar 16. The brackets 82, 84 may be attached to the first end 18 and the second end 20 in any suitable way. For example, the brackets 82, 84 may be welded the first end 18 and the second end 20. In other examples, the brackets 82, 84 may be fixed in other suitable ways such as fasteners, adhesives, etc.

In the example shown in FIGS. 2A, 2B, 3A, 3B, and 4A-4E, the brace 22 is slidably supported by the brackets 82, 84. The brackets 82, 84 define bracket holes 86, 88, for example a first bracket hole 86 and a second bracket hole 88. Specifically, the first bracket 82 defines the first bracket hole 86 and the second bracket 84 defines the second bracket hole 88. The bracket holes 86, 88 are each elongated along the vehicle-longitudinal axis L. The brace 22 is received by the bracket holes 86, 88 and is slidably supported by the bracket holes 86, 88. For example, the first portion 24 of the brace 22 is received by the first bracket hole 86 of the first bracket 82 and the second portion 26 of the brace 22 is received by the second bracket hole 88 of the second bracket 84. The first portion 24 is slidably supported by the first bracket hole 86 and the second portion 26 is slidably supported by the second bracket hole 88. During normal operation of the three-wheeled vehicle 10, e.g., driving, the bracket holes 86, 88 maintain the position of the brace 22. In other words, a press fit exists between the bracket holes 86, 88 and the brace 22 for the brace 22 to remain stationary relative to the crossbar 16 during normal operation of the three-wheeled vehicle 10. During certain vehicle impacts, the brace 22 may slide along the vehicle-longitudinal axis L within the bracket holes 86, 88 if a force is applied to the brace 22 that overcomes a predetermined level. Specifically, the force may overcome the press fit between the bracket holes 86, 88 and the brace 22 for the brace 22 to slide relative to the brackets 82, 84.

In a second example shown in FIGS. 2B and 3C, the crossbar 16 defines a pair of holes 90, 92 at the first end 18 and the second end 20 of the crossbar 16 to support the brace 22. Specifically, the crossbar 16 defines a first hole 90 at the first end 18 and the crossbar 16 defines a second hole 92 at the second end 20. The first hole 90 and the second hole 92 are each elongated along the vehicle-longitudinal axis L. The brace 22 is received by the first hole 90 and the second hole 92 and the brace 22 is slidably supported by the first hole 90 and the second hole 92. For example, the first portion 24 of the brace 22 is received by the first hole 90 of the crossbar 16 and the second portion 26 of the brace 22 is received by the second hole 92 of the crossbar 16. The first portion 24 is slidably supported by the first hole 90 and the second portion 26 is slidably supported by the second hole 92. During normal operation of the three-wheeled vehicle 10, e.g., driving, the first hole 90 and the second hole 92 maintain the position of the brace 22. In other words, a press fit exists between the first hole 90, second hole 92, and the brace 22 for the brace 22 to remain stationary relative to the crossbar 16 during normal operation of the three-wheeled vehicle 10. During certain vehicle impacts, the brace 22 may slide along the vehicle-longitudinal axis L within the first hole 90 and the second hole 92 if a force is applied to the brace 22 that overcomes a predetermined level. Specifically, the force may overcome the press fit between the holes 90, 92 and the brace 22 for the brace 22 to slide relative to the holes 90, 92.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
    a vehicle frame;
    a steering post rotatably supported by the vehicle frame;
    a crossbar supported by the steering post, the crossbar being bisected by the steering post;
    the crossbar elongated in a cross-vehicle direction from a first end to a second end;
    a brace supported by the crossbar, the brace having a first portion, a second portion spaced from the first portion, and a curved portion connecting the first portion to the second portion; and
    the first portion being supported by the first end of the crossbar and the second portion being supported by the second end of the crossbar.

2. The vehicle of claim 1, wherein the brace includes a notch between the first portion and the curved portion, the brace being bendable at the notch relative to the vehicle frame.

3. The vehicle of claim 2, wherein the brace includes a second notch between the second portion and the curved portion, the second notch being spaced from the notch and the brace being bendable at the second notch relative to the vehicle frame.

4. The vehicle of claim 1, wherein the brace is slidably supported by the crossbar.

5. The vehicle of claim 1, wherein the crossbar includes a first bracket fixed at the first end and a second bracket fixed at the second end, the first portion of the brace being slidably supported by the first bracket and the second portion of the brace being slidably supported by the second bracket.

6. The vehicle of claim 5, wherein the first bracket defines a first hole and the second bracket defines a second hole, the first portion of the brace being slidably supported by the first hole and the second portion of the brace being slidably supported by the second hole.

7. The vehicle of claim 1, wherein the crossbar defines a first hole at the first end and the crossbar defines a second hole at the second end, the first portion of the brace being slidably supported by the first hole and the second portion of the brace being slidably supported by the second hole.

8. The vehicle of claim 1, wherein the vehicle frame is elongated along a vehicle-longitudinal axis, the brace being slidable relative to the crossbar along the vehicle-longitudinal axis.

9. The vehicle of claim 8, wherein the brace is elongated along the vehicle-longitudinal axis.

10. The vehicle of claim 8, wherein the first portion and the second portion of the brace are elongated along the vehicle-longitudinal axis.

11. The vehicle of claim 1, further comprising a wheel connected to the steering post, the brace being supported upwardly along the steering post from the wheel.

12. The vehicle of claim 1, wherein the steering post is rotatable about an axis, the crossbar and the brace being rotatable about the axis.

13. The vehicle of claim 12, further comprising a wheel connected to the steering post, the brace being supported upwardly along the axis from the wheel.

14. The vehicle of claim 1, wherein the brace is symmetrical about the steering post.

15. The vehicle of claim 1, wherein the brace is elongated vehicle-forward of the steering post.

16. The vehicle of claim 1, wherein the brace is elongated vehicle-forward of the vehicle frame.

* * * * *